United States Patent
Kumagai

Patent Number: 5,438,634
Date of Patent: Aug. 1, 1995

[54] DITHER PROCESSING METHOD

[75] Inventor: Ryohei Kumagai, Tokyo, Japan

[73] Assignee: Ezel Inc., Tokyo, Japan

[21] Appl. No.: 247,397

[22] Filed: May 23, 1994

Related U.S. Application Data

[60] Continuation of Ser. No. 930,784, Aug. 17, 1992, abandoned, which is a division of Ser. No. 512,258, Apr. 20, 1990, Pat. No. 5,201,013.

[30] Foreign Application Priority Data

Apr. 24, 1989 [JP] Japan .................. 1-103695
Jun. 9, 1989 [JP] Japan .................. 1-147229
Jun. 20, 1989 [JP] Japan .................. 1-157164

[51] Int. Cl.$^6$ ............................................. G06K 9/38
[52] U.S. Cl. ................................. 382/169; 382/270; 358/465; 358/457
[58] Field of Search ........................ 382/50-53, 382/56, 54; 358/457, 465, 466

[56] References Cited

U.S. PATENT DOCUMENTS

| | | | |
|---|---|---|---|
| 4,339,774 | 7/1982 | Temple | 358/283 |
| 4,562,486 | 12/1985 | Suzuki et al. | 358/466 |
| 4,654,721 | 3/1987 | Goertzel et al. | 358/283 |
| 4,700,229 | 10/1987 | Herrmann et al. | 358/166 |
| 4,758,897 | 7/1988 | Hiratsuka et al. | 358/457 |
| 4,783,838 | 11/1988 | Matsunawa | 382/51 |
| 4,827,352 | 5/1989 | Yoneda et al. | 358/457 |
| 4,878,125 | 10/1989 | Katayama et al. | 358/443 |
| 4,891,714 | 1/1990 | Klees | 358/456 |
| 4,924,322 | 5/1990 | Kurosawa et al. | 358/448 |
| 4,955,065 | 9/1990 | Ulichney | 382/50 |
| 4,975,786 | 12/1990 | Katayama et al. | 358/459 |

Primary Examiner—Yon J. Couso
Attorney, Agent, or Firm—Cushman, Darby & Cushman

[57] ABSTRACT

A dither processing method generates a binary-value image from an original image. The original image is converted to a binary-value image by a dither process. For each area in the dither image that corresponds to a dither cell, a representative density is calculated from the number of black (or white) pixels produced by the dither process. A median value of representative densities is then used as a threshold, and the original image is converted to a binary-value image using the threshold. By using the median of representative values, lighting of the original image is corrected.

7 Claims, 13 Drawing Sheets

|  | 20 | 24 |  |
|---|---|---|---|
| 16 | 0 | 4 | 28 |
|  | 12 | 8 |  |

|  | 21 | 25 |  |
|---|---|---|---|
| 17 | 1 | 5 | 29 |
|  | 13 | 9 |  |

|  | 22 | 26 |  |
|---|---|---|---|
| 18 | 2 | 6 | 30 |
|  | 14 | 10 |  |

|  | 23 | 27 |  |
|---|---|---|---|
| 19 | 3 | 7 | 31 |
|  | 15 | 11 |  |

DITHER PROCESSING METHOD

This is a continuation of application Ser. No. 07/930,784, filed on Aug. 17, 1992, which was abandoned upon the filing hereof; and which was a divisional application of 07/512,258, filed Apr. 20, 1990, now U.S. Pat. No. 5,201,013.

BACKGROUND OF THE INVENTION

1. Field of the Invention

The present invention relates to a method of representing images with gray levels, particularly to the so-called "dither method" for representing images with gray levels approximately by binary images.

2. Prior Art

An outline of conventional methods for binarizing is shown in Table 1.

TABLE 1

| BINARIZATION (narrow sense) | FIXED AREA | Processing with a certain threshold in all areas. |
|---|---|---|
| | CHANGEABLE THRESHOLD | Processing with a different threshold in every area or ever pixel. |
| DITHER | ORGANIZED DITHER | Binarizing all areas with one or more dither matrices. |
| | RANDOM DITHER | The cyclic feature of organized dither is eliminated by adding random components to dither matrix. |
| BINARIZATION & DITHER | | Binarization is performed in a character area and dither is performed in a gray-level area. |
| ERROR DIFFUSION METHOD | | Processing with a threshold comparing the binary error of pixels in a neighborhood of a pixel to be processed. |

Though the purpose of binarizing an image is generally to reduce the quantity of information, some image characteristics are lost as a matter of course because of the decrease of information. For example, when a character or configuration of an original image is to be shown clearly, the main characteristics are preserved by performing binarization (narrow sense) which can divide the original image into figures and background. On the other hand, when an original image is to be expressed with gray-levels, such as a solid natural image, it is to be expressed by pseudo-multi-levels through dither. If binarization (narrow sense) is performed in this case, the characteristics of gray-levels in the original image are lost. Actually, there are many cases in which an image including both characters and photographs are processed in the field of printing, facsimile and so on. Therefore, it is impossible to reproduce the characteristics of a whole image by a binarization method suitable only for gray-level image or characters.

To solve this problem, a method has been suggested in which binarization in a narrow sense is performed in a character area and dither is performed in a configuration area after dividing an image into a character area (the area on which to perform binarization in a narrow sense) and a configuration area (the area to be expressed by pseudo-multi-levels). When performing such compound processing, the boundary between two areas becomes discontinuous; consequently, the result expressed by binarization becomes an extremely unnatural image.

Generally, the image to be processed is binarized through the following steps:
 i) Defining the threshold of each pixel in a square dither cell of n×n pixels,
 ii) Applying the dither cell to the image to be processed.

Here, using dither of a dispersive type (such as Bayer type), a bigger dither cell is used for deepening the grade of depth. Consequently, the image becomes dim, and cyclic artifacts (which are a characteristic of dither) becomes significant because black pixels do not concentrate on edges. On the other hand, mesh-dot type and spiral-type dither have the following characteristics: it is possible to represent approximate mean densities more naturally, but it becomes a rough-dot image when the depth is deepened.

There is another method for binarization referred to as error diffusing method. It is possible to express an image by pseudo-multi-levels without limitation on the number of the levels of density. An error diffusing method is described below.

The principles of an error diffusing method are discussed with reference to FIG. 19. Assuming the pixel value (e.g. brightness) on the coordinate (m, n) of an original image to be fmn, fmn is binarized considering the influence of the binary error of pixels in a predetermined neighborhood. For example, suppose that fmn is binarized by R/2 (a threshold level which is one half of the image density range) and the conversion below is performed. The binarized error indicated in formula (1) is generated with respect to the first pixel f00 on the coordinate (0, 0).

$fmn => R/2 \rightarrow R$ $fmn < R/2 \rightarrow 0$ $e00 = f00 - [f00 - R/2]$ where, [] means Gauss' notation (i.e., the maximum integer number less than the real number within the brackets) and R is the maximum range of densities in the image.

Concerning a general pixel fmn, binarized error emn can be obtained as discussed below. Defining a certain area (in FIG. 19, the area is comprised of 6 pixels including the pixel to be processed with the mark "X"), weights for each error in this area (in FIG. 19, from w1 to w6) are defined. The weight-addition-matrix for the peripheral pixel is called an error filter. Binary error emn for a pixel fmn is obtained by formula (2).

$$emn = \{fmn + \Sigma wiei\} - R \ [fmn + \Sigma wiei - R/2] \quad (2)$$

Here, $\bar{f}mn$ and $gmn$ are defined as formula (3) and (4).

$$\bar{f}mn = fmn + \Sigma \ wiei \quad (3)$$

$$gmn = R \ [\bar{f}mn - R/2] \quad (4)$$

Therefore, formula (2) is equal to formula (5).

$$emn = \bar{f}mn - gmn \quad (5)$$

As shown in the formula above, binary error emn contains an integrated binary error of pixels in a neighborhood around the pixel to be processed. The difference between the brightness of a whole binarized image and a whole original image is minimized. Additionally, the density distributions of the binarized image and of the original image are substantially equal. The binary error of each pixel is stored in an error buffer. The characteristics of an image binarized with an error diffusion method is decided by the error filter, that is, there has been a poor possibility that both a character area and a configuration area would be expressed adequately.

An improved error diffusion method has been suggested. Namely, an error filter is defined as a forecast type so that stripes caused by an error filter are removed and simultaneously the distribution steepness of dark spots is sharp. An image processed by such a forecasting method emphasizes outlines and generates an unnatural image.

When darkness is not even over a whole image, the contrast of a part of the image is extremely unclear when processing the whole image with a certain threshold. Shading can be devised in order to overcome this problem. Shading is: dividing an image into some parts, the most appropriate threshold is calculated in each area by a so-called "mode method". (A. Rosenfeld & Avinash C. Kak, "Digital Picture Processing", 1976, Academic Press, Inc.)

"Mode method" is, however, the method for calculating a local minimal value of histogram of an image. It takes much time; consequently, the time for processing becomes vast when the number of areas in an image is large. It is not easy to reduce processing time, because, executing "mode method" by hardware is difficult.

SUMMARY OF THE INVENTION

The present invention is intended to solve the above problems of the prior art and has an object to provide a method of representing images and for generating dither images having natural degrees of depth.

The present invention has an object to provide a method for representing an image, reproducing the characteristics of a whole image having a characteristic area and a configuration area, and giving a natural image.

The present invention is intended to solve the above problems of the prior art and has an object to provide a processing method with thresholds for performing binarization of images.

A representing method for images in accordance with the present invention works as discussed below with reference to the following steps:
  a) Defining a non-rectangle dither cell and a macro dither cell consisting of a plurality of dither cells arranged in a predetermined form;
  b) Defining orders of magnitudes of thresholds of pixels in the dither cell;
  c) Defining orders of magnitudes of thresholds of the dither cells in the macro dither cell;
  d) Defining a threshold for each pixel of each dither cell in the macro dither cell according to the orders of magnitude of thresholds of the pixels in the dither cell as well as the dither cells in the macro dither cell.

According to the method for representing images of the present invention, it is possible to deepen the depth of a dither image because the densities of an image to be processed are evaluated within a macro dither cell. Since pixels are dispersed in a macro dither cell of a dither image, a natural impression is generated. The threshold order of a dither cell in a macro dither cell and that of each pixel in a dither cell are defined.

A method for expressing binarization of an image according to the present invention is an improvement of the error diffusion method in that the weights are changed according to the density of the objective pixel.

According to the method of the present invention, it is possible to express all of a character area, a configuration area and a background area as a binarized image because the weight of binary error is changed according to the pixel value. The boundary of each area is connected smoothly and a natural image is generated.

A processing method according to the present invention may include steps of:
  an original image is binarized by a systematic dither cell so that a dither image is generated;
  a representative density is calculated for each area in the dither image corresponding to the dither cell;
  a median value is calculated of representative densities of the dither image;
  the original image is binarized by a threshold of the median value.

According to the processing method of the present invention, it is easy to calculate a threshold because a threshold is selected based on each representative pixel value of a dither image of an original image. It is possible to process in high speed by execution in hardware because dither processing can be performed by computations between images of a dither cell and original image.

BRIEF DESCRIPTION OF THE DRAWINGS

FIG. 15 shows a diagram of a dither cell modified by random number zero (0);

FIG. 16 shows a diagram of a dither cell modified by random number one (1);

FIG. 17 shows a diagram of a dither cell modified by random number two (2);

FIG. 18 shows a diagram of a dither cell modified by random number three (3);

PREFERRED EMBODIMENT OF THE PRESENT INVENTION

Hereinafter, an embodiment of the method for representing images with gray levels according to the present invention is described with reference to the attached drawings.

Figure 1:
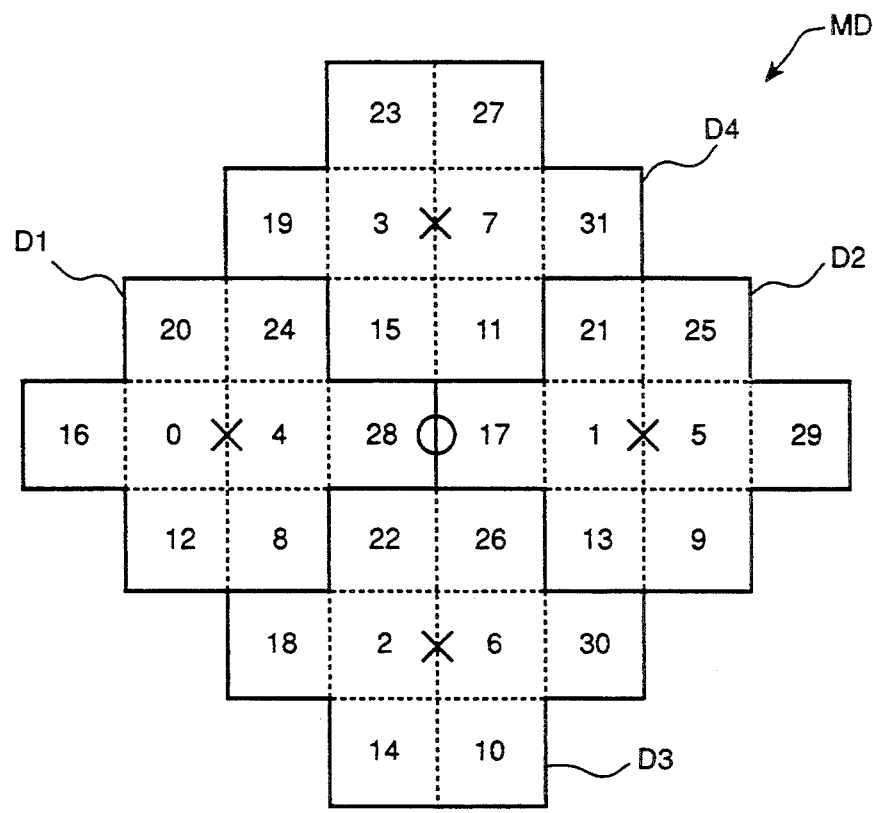
FIG. 1 shows a diagram of the first embodiment.
Figure 2:
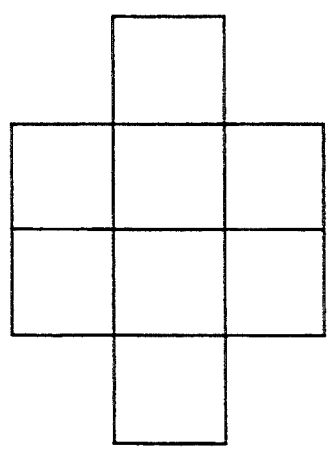
FIG. 2 to FIG. 9 show diagrams of various dither cells.

FIG. 1 shows dither cells within a macro dither cell. The whole figure shows a macro dither cell MD. Those rimmed with solid lines are dither cells D1 to D4 within the macro dither cell MD.

Dither cells D1 to D4 are substantially regular structures with 8 pixels. Six pixels are arranged as 3 rows of 2 pixels each. Two additional pixels are added, one to the left side and one to the right side of the center row. The order of magnitude of the threshold is defined for each dither cell according to the following order:

1) The left pixel of the two of center pixels,
2) The right pixel of the two of center pixels,
3) The right pixel of the two on the bottom line,
4) The left pixel of the two on the bottom line,
5) The left side pixel added to the center row,
6) The left pixel of the two on the top line,
7) The right pixel of the two on the top line,
8) The right side pixel added to the center row.

This is equivalent to a spiral type of pattern given to each dither cell. The threshold magnitude order is given to the dither cells from D1 to D4 in this embodiment. Circulating dither cells from D1 to D4 and giving a pixel to each dither cell, the density is represented over a region of a macro dither cell. Spiral patterns are not generated in the resulting dither image, and a natural impression is generated. The density of the image to be processed is evaluated for an area making up a macro dither cell, the range of possible densities being 8×4=32. More than 32 density levels are generally necessary to represent an image naturally. Even if processing by 32 degrees of dither, a natural dither image may not be generated by conventional dither.

Dither cells from D1 to D4 are arranged such that the centroids (marked with "X" in FIG. 1) are top points of a rhombus. The centroids of each dither cell are arranged to be close to the centroid of the macro dither cell (distance of 2 pixels). Consequently, the pixels arranged circularly in dither cells from D1 to D4 give the impression that they are very dense.

The shape of a dither cell may have various patterns as sown from FIG. 2 to FIG. 9, which give natural impressions.

Figure 3:
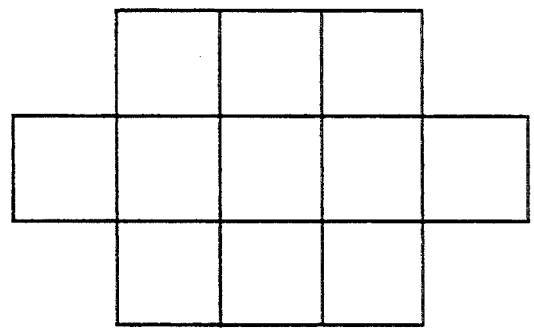

FIG. 3 shows the dither cell having a substantially square shape of 11 pixels. A macro dither cell including 4 of them is constructed as shown in FIG. 10.

Figure 10:
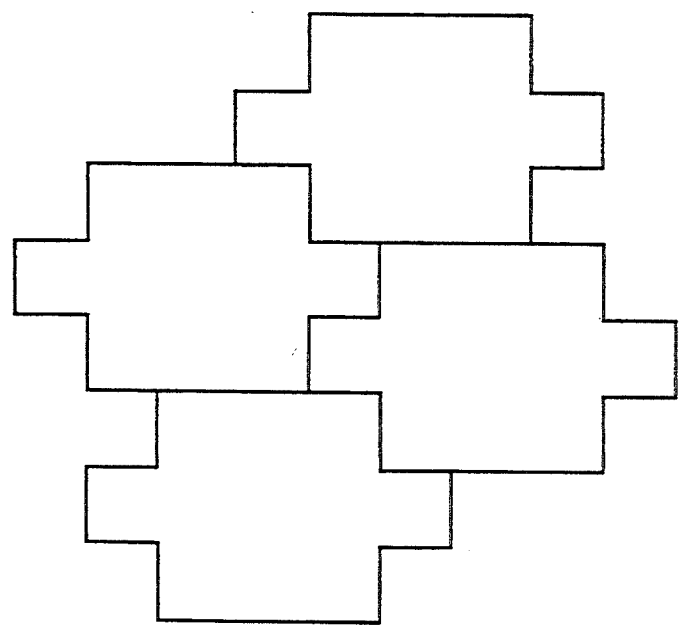
FIG. 10 shows a diagram of a macro dither cell using the dither cell in FIG. 3.

It is possible to represent densities with 11×4=44 degrees by the macro dither cell in FIG. 10.

Figure 4:
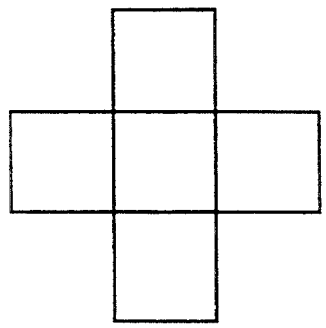
Figure 5:
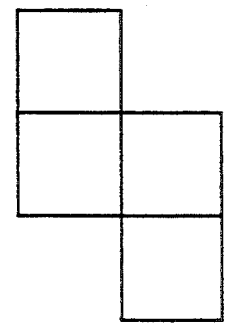
Figure 6:
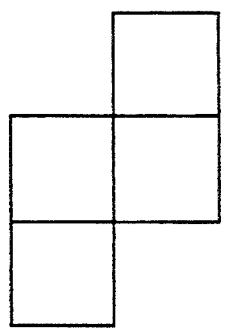
Figure 7:
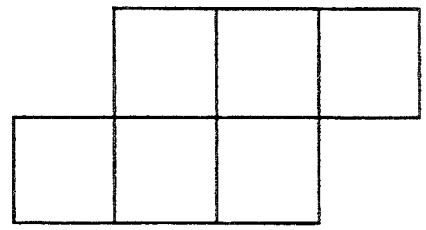
Figure 8:
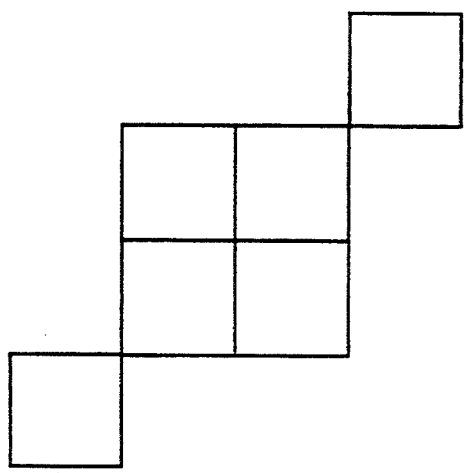
Figure 9:
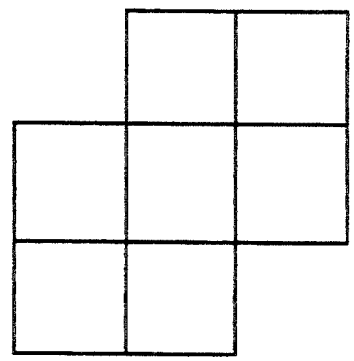
Figure 11:
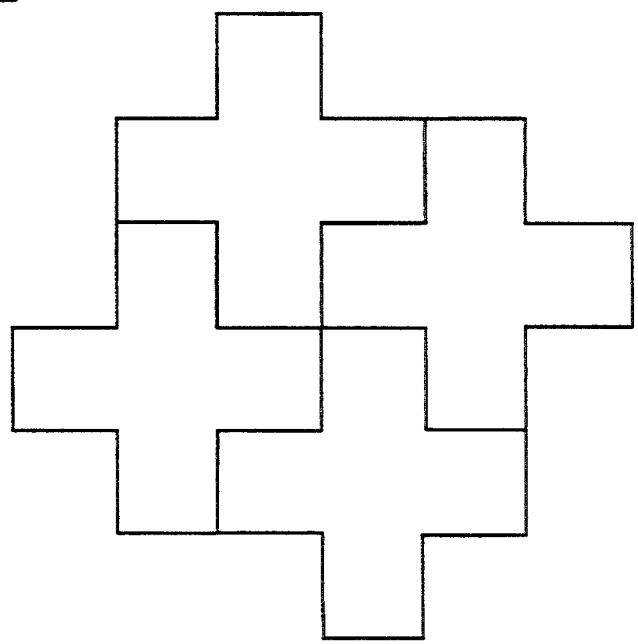
FIG. 11 shows a diagram of a macro dither cell using the dither cell in FIG. 4.

FIG. 4 shows a cross-shaped dither cell of 5 pixels. A macro dither cell including 4 of them is constructed as shown in FIG. 11. It is possible to represent densities with 5×4=20 degrees by the macro dither cell in FIG. 11. The resulting dither image is very dense as a whole.

The threshold pattern of each dither cell in a macro dither cell is selected beforehand in the above embodiment and its varieties. When random variability is given to the threshold pattern of each dither cell, the dither image has an even more natural impression.

FIGS. 12 through 18 show an embodiment which generates a random variability. A comparison image RIM is generated having the same size as the image IM to be processed. Each data entry of the comparison image IM is a random number shown as r1, r2, etc. Random numbers may be 0, 1, 2, and 3. When a macro dither cell MD is applied in a certain area in the image IM to be processed and a pixel within the area is to be processed, the random number of the corresponding data entry in the comparison image is compared at the same time. For each random number from 0 to 3, there is a corresponding dither cells D1 to D4. When the random numbers are "0", "1", "2" and "3", exemplary dither cells D1, D2, D3 and D4 are as shown in FIGS. 15 to 18 respectively.

Figure 12:
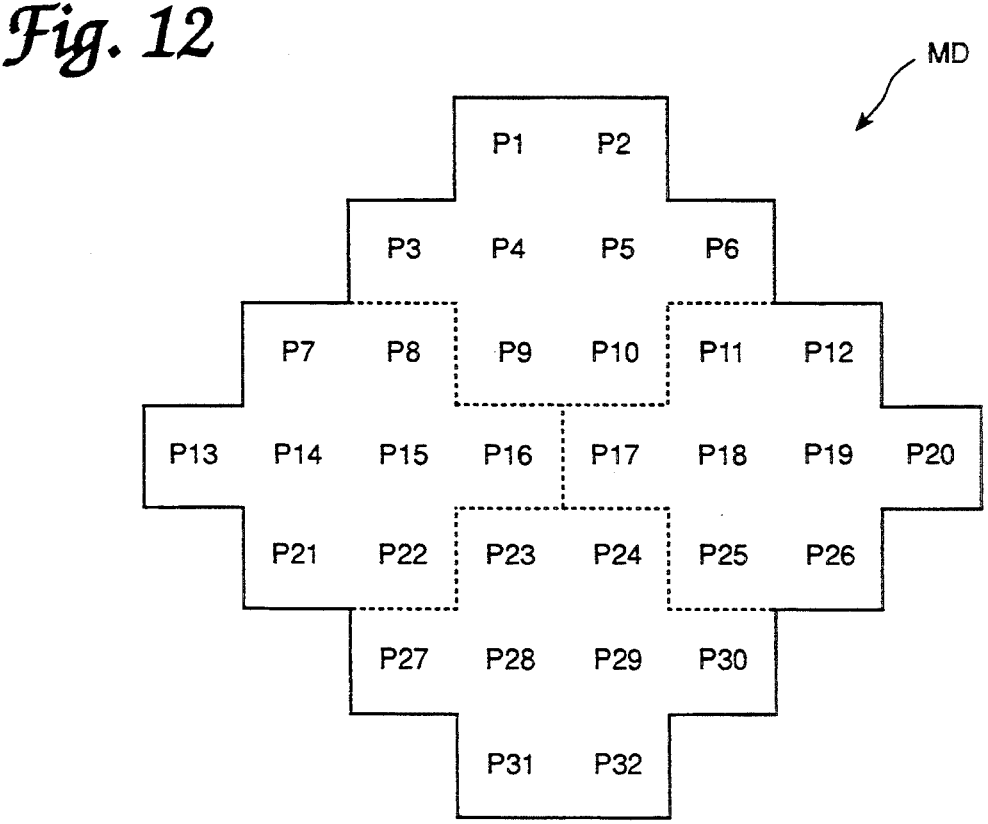
FIG. 12 shows a diagram of a macro dither cell to whose pixels are given numbers.
Figures 13, 14:
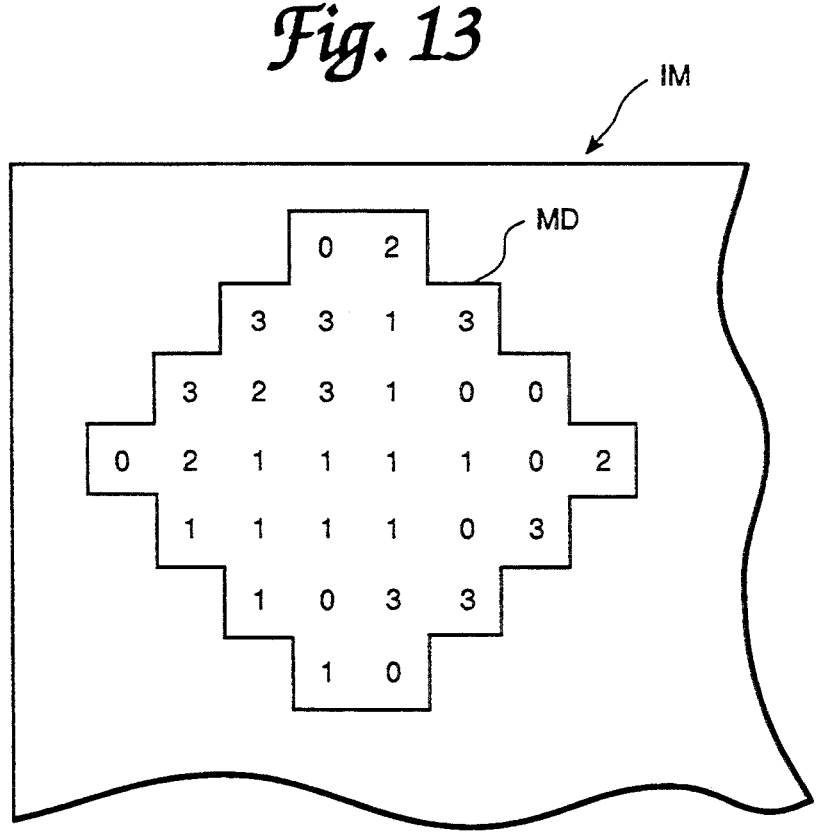
FIG. 13 shows a diagram of an embodiment whose macro dither cell is applied for images to be processed.
FIG. 14 shows a diagram of a comparison image of the embodiment of FIG. 13.
Figure 19:
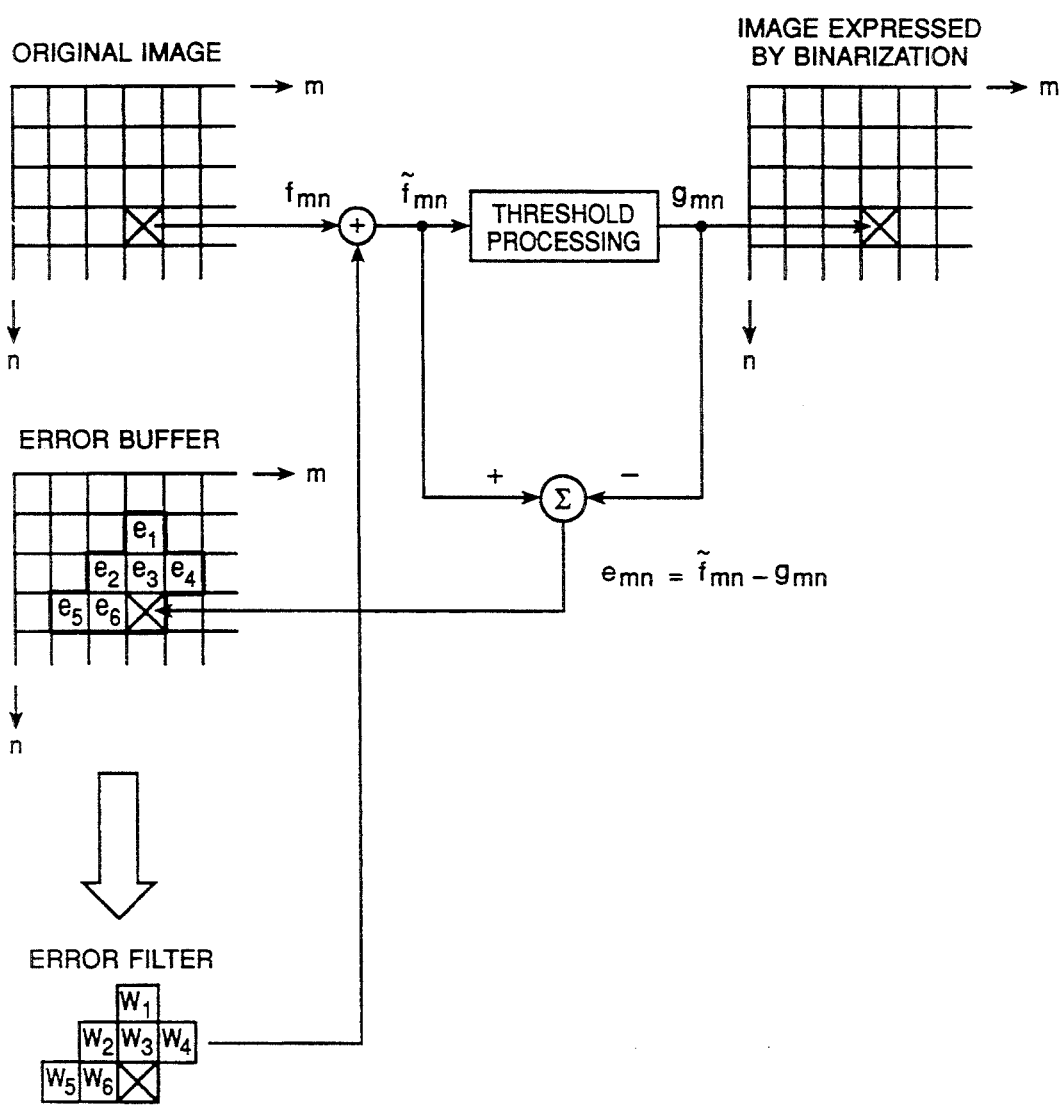
FIG. 19 shows a block diagram of principle aspects of a conventional error diffusion method.

In FIG. 12, the pixels in a macro dither cell MD are shown by the numbers from P1 to P32. FIG. 13 shows an example of the random numbers ri from the comparison image IM which correspond to the pixels in the image IM to be processed. For instance, as to the pixel P1 of the left pixel on the top row of macro dither cell MD, the random number form RIM may be "0" as shown in FIG. 13. The random number "0" corresponds to dither cell D1. Dither cell D1 is applied to the pixel P1. The place of the pixel P1 corresponds to the left one of the top line of the dither cell D1. The threshold of the pixel P1 is "20" as shown in FIG. 15. Therefore, the pixel P1 is binarized by the threshold "20". In this way, the dispersion of pixels in a dither image becomes random by randomly changing the applied dither cell and a more natural impression can be generated. Similarly, random numbers "1", "2" and "3" applied to the dither cell produces dither thresholds as shown in FIGS. 16, 17 and 18, respectively.

It is, of course, possible to generate random numbers by using existing pseudo-random numbers sequence. More natural dither images can be obtained by quantizing a natural image of highly random characteristics which may be from a camera and binarized into levels from 0 to 3. This results in a more natural image because pseudo-random numbers often have a certain cycle.

Though mean densities may rise for some random number distributions, such obstacles can be prevented completely by flattening the generation frequency of random numbers. For instance, in the comparison image RIM, the generation frequency of random numbers becomes flat by dispersing the random numbers so that the number of occurrences of random numbers from 0 to 3 in each macro dither cell is even. When random numbers with the same distribution are applied to every macro dither cell in order to equalize occurrences of random numbers, the dither image has some cyclic features. Such cycles can be avoided by changing the distribution of the random numbers according to the random numbers of every macro dither cell. It is not necessary to flatten the frequency of random number appearance within a single macro dither cell. It may be flattened over an area covered by plural macro dither cells.

Therefore, it is possible to represent an image by dense dots in each part, increasing the number of degrees of a macro dither cell. That is, it is possible to represent an image with false gray level with good resolution.

More natural images with gray levels can be realized by selecting threshold orders for dither cells in a macro dither cell according to a series of random numbers.

Hereinafter, an embodiment of the method for expressing binarization of image according to the present invention is described with reference to the attached drawings.

Figure 20:
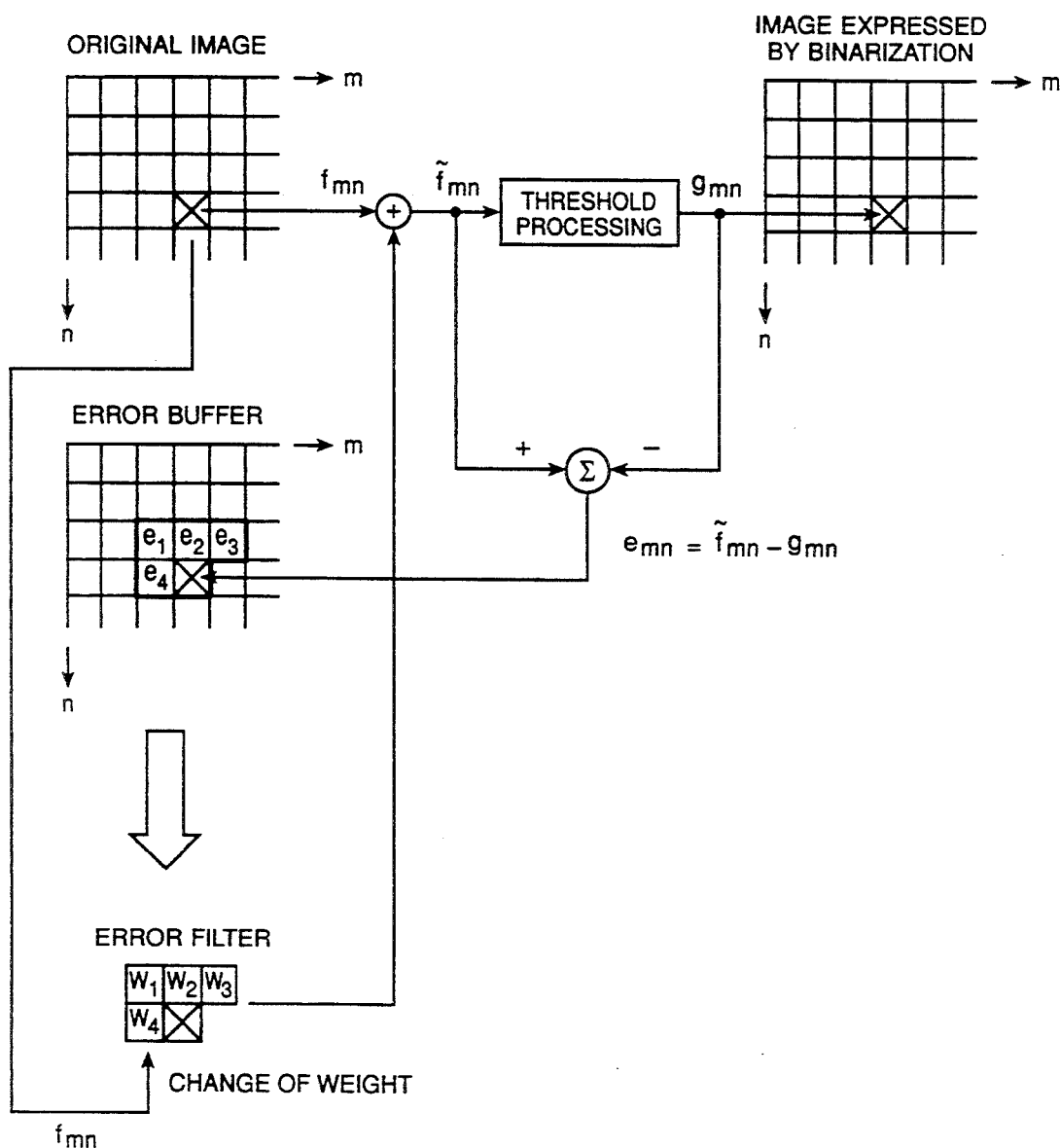
FIG. 20 shows a block diagram of an embodiment of the present invention.

In FIG. 20, the error filter of the present embodiment comprises 4 pixels adjacent to the pixel to be processed: the pixel corresponding to the pixel to be processed on the previous scan line; the pixels before and after it on the previous scan line; and the previous pixel on the same scan line as the pixel to be processed. In FIG. 20, the binary errors of these pixels are given as e1 to e4 along the direction of scan. The error filter gives the binary errors e1 to e4 the weights of w1 to w4, respectively.

Weights w1 to w4 are not stable but changeable according to the value of the pixel to be processed. Therefore, when a pixel value is fmn, weights w1 to w4 can be expressed by formula (6).

$$wi(fmn) \quad (i \text{ is from 1 to 4}) \tag{6}$$

Using the expression of an error diffusing method, the present embodiment is expressed by formulae from (7) to (9).

$$\tilde{fmn} = fmn + \Sigma wi \, (fmn) \tag{7}$$

$$gmn = R[\tilde{fmn} - R/2] \tag{8}$$

$$emn = \tilde{fmn} - gmn \tag{9}$$

The expression in formula (7) can be applied for any error filter, without limitation of the value of i.

The considerations for the relationship between the weights wi(fmn) and the binarized image is described below.

Assuming that wi(fmn)=0, the following two formulae are true:
$$\tilde{fmn} = fmn$$

$$gmn = R[\tilde{fmn} - R/2 \,]$$

The above formulae are equivalent to binarization in narrow sense.

On the other hand, assuming that wi(fmn)>>0, binary error in a neighborhood strongly reflects the pixel to be processed, that is, the pixel to be processed has the tendency to be a black pixel when there are many white pixels around it. In a local area, an averaged density distribution is generated, similarly to smoothing. The processing is suitable for expressing an image of smooth gray levels.

From the statement above, it becomes clear that the characteristics of a whole image can be reproduced with fidelity by lightening wi(fmn) in character areas and adding weight to wi(fmn) in configuration areas. As the weight is decided according to the pixel value of every pixel and it is changeable for every pixel, all areas are connected smoothly.

There may be many characteristics of wi(fmn). The characteristics of FIG. 21 to FIG. 24 give good results.

Figure 21:
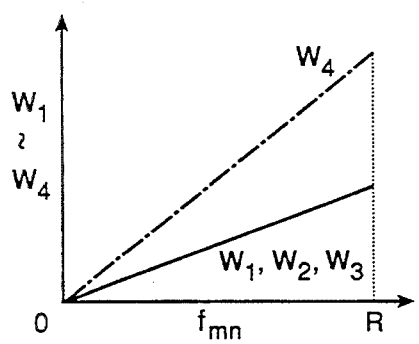
FIG. 21 is a diagram showing first characteristics of weights in the third embodiment.

FIG. 21 shows a monotone increase of w1 to w4 as a function of fmn. The larger the pixel value fmn, the more the weights.

For instance, when such weight characteristics are given to an image which has gray-level areas with middle brightness and high brightness, and which also has characters with low brightness (e.g. black), the character area is binarized clearly and a proper pseudo-grey level expression is generated for gray-level areas.

Figure 22:
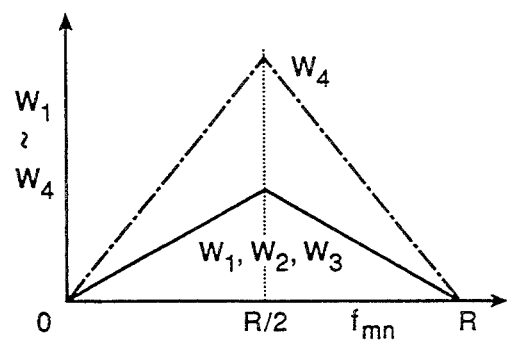
FIG. 22 to FIG. 24 are diagrams showing second through fourth characteristics of weights, respectively.

In FIG. 22, w1 to w4 increase when fmn is less than or equal to the brightness R/2 and decrease when fmn is greater than the brightness R/2. When such characteristics are used, clear binarization (in narrow sense) is performed in low brightness areas and high brightness areas, and multi-level expressions are generated for gray-level areas. Low brightness characters against a high brightness background (e.g. white) are clearly binarized by this characteristic.

Conventionally monochromatic expressions are seldom found in background areas, and dither pattern often exists scatteringly. In this case, the distinction between character and configuration becomes unclear, and the quantity of data for a background area increases; consequently, communication becomes inefficient by facsimile. By performing binarization or a process like it, it becomes possible to indicate background areas monochromatically.

Figure 23:
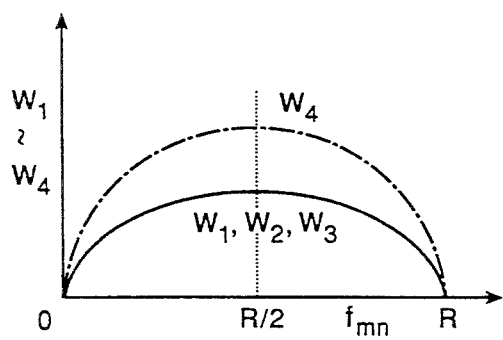

In FIG. 23, w1 to w4 are convex variations of the characteristics of FIG. 22, i.e., monotonic increase for fmn<R/2 and monotonic decrease for fmn>R/2. Executing such characteristics, the density ranges expressed in multiple levels becomes wider and binarization is performed only in the area of extremely low brightness and in the area of extremely high brightness.

Figure 24:
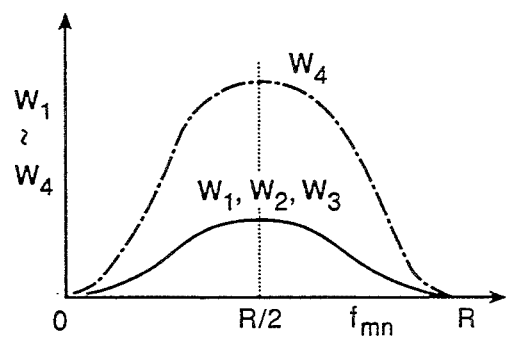

In FIG. 24, w1 to w4 characteristics are concave on both sides and convex in the middle. This is another variation of the characteristic of FIG. 22. Executing such characteristics, the density ranges which are binarized become more clear and the grade of smoothing for the area to be given multi-level expressions becomes high.

The error filter in FIG. 20 gives a good result under the conditions below:
  w1=w2=w3
  1.5 w1=<w4=<2.5 w1
  0.10=<w1=<0.26

Generally, it is clear that middle values of the above condition provide good results.

Figure 25:
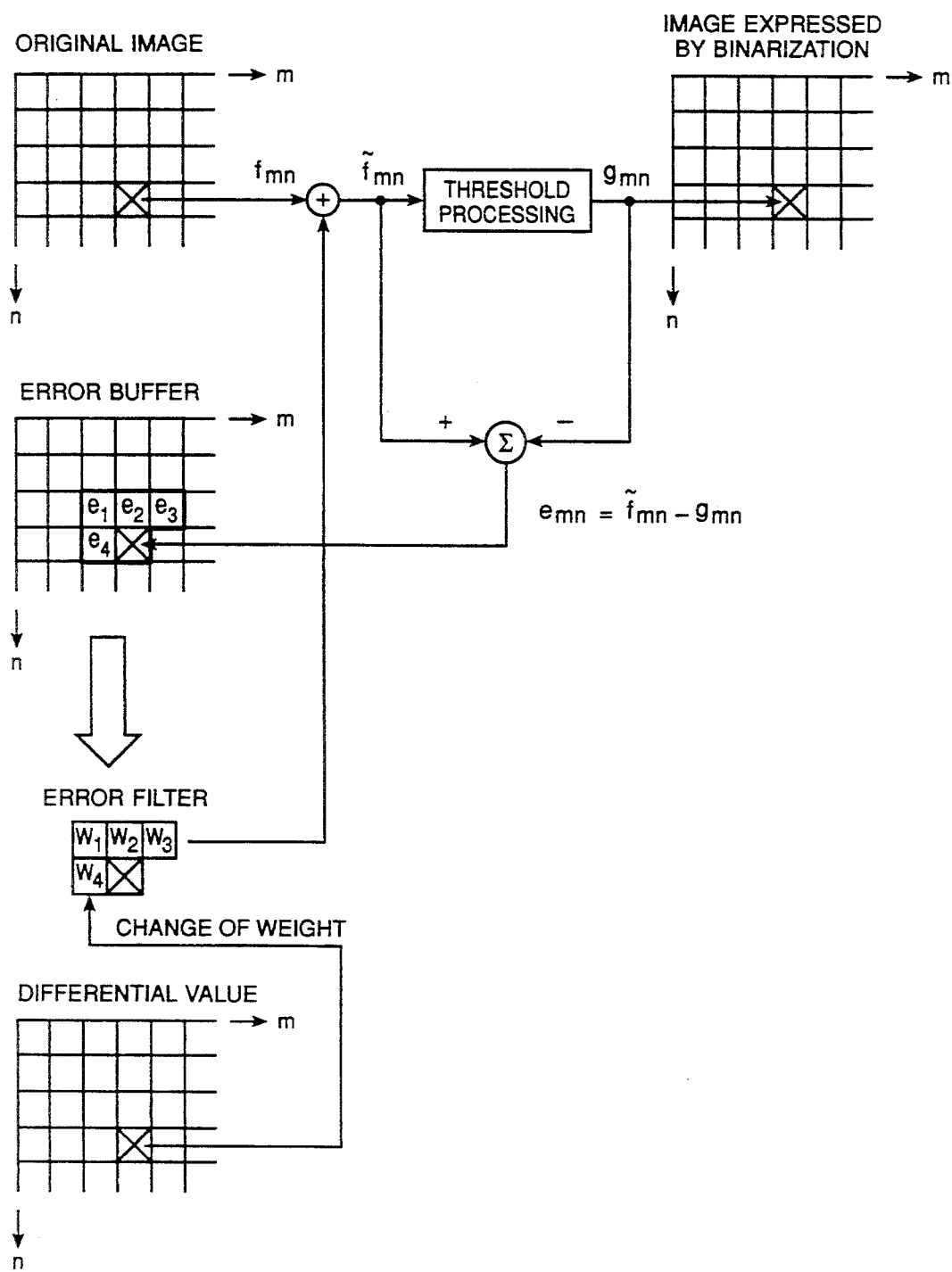
FIG. 25 shows a block diagram of an alternate embodiment.

FIG. 25 shows an embodiment of the present invention. The weight of the error filter is selected according to the differential value of an original image. The differential value tends to be remarkably large on the boundary of a configuration area, and it tends to be large in gray-level areas in comparison with characters and background in character areas. Therefore, weights are changeable based on a differential value (the first degree differential, the second degree differential, Laplacian, Sobel operator and other differential operators).

Hereinafter, an embodiment of a processing method according to the present invention is described with reference to the attached drawings.

Figure 26:
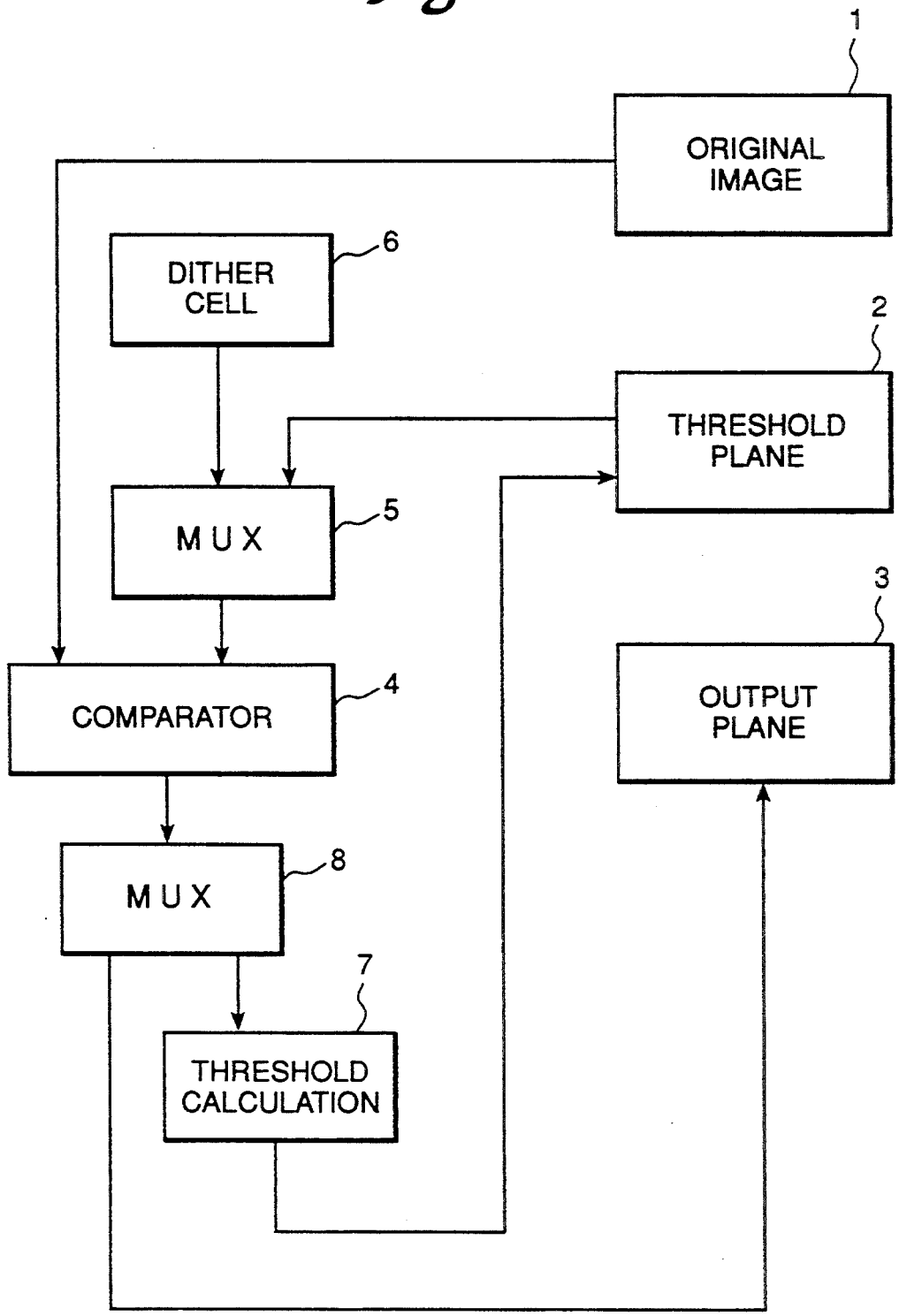
FIG. 26 is a block diagram showing the image processing system to be applied to an alternate embodiment.

FIG. 26 shows an image processing system to be applied to the embodiment, which comprises memory 1 holding the original image, and memories 2 and 3 as a threshold plane and an output plane, respectively. Memory 1 is connected to comparator 4, and pixel data of the original image is compared with the output of multiplexer 5. Multiplexer 5 is connected with register 6 for storing dither cells. Each pixel of the original image and dither cells are compared by the first scan, and a dither image is generated through comparison of a dither cell with the original image and output from comparator 4.

Figure 27:
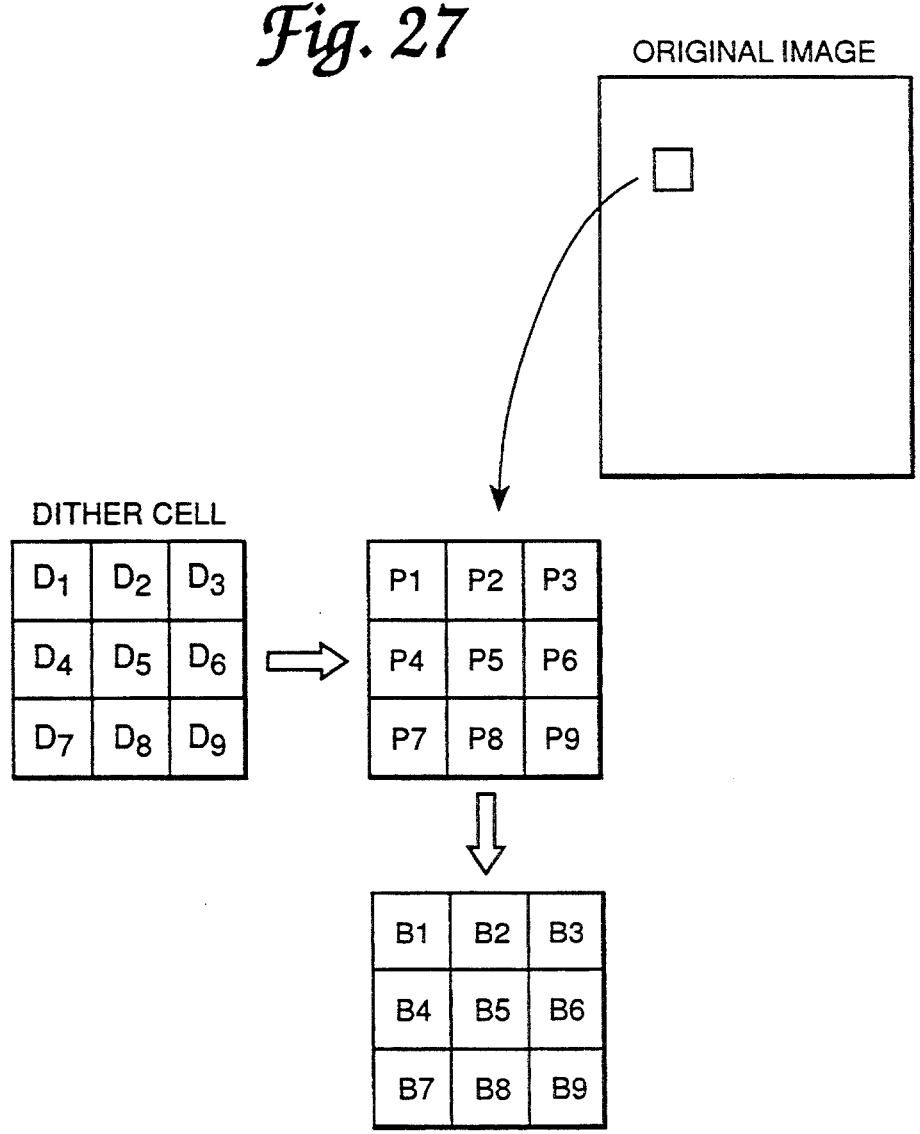
FIG. 27 is a block diagram showing an example of dither.

Any organized dither can be applied for the dither method. For example, the processing in FIG. 27 is performed for a 3×3 Bayer pattern. Assuming the density of each element of the dither cell to be from D1 to D9, these densities are given in spiral order. That is, the order is as follows:

D5=0
D8=1
D7=2
D4=3
D1=4
D2=5
D3=6
D6=7
D9=8

The dither cell is applied to an image area corresponding to each dither cell.

When the density of each pixel in the image area corresponding to a dither cell is from P1 to P9, Bi of each pixel's density after performing dither is calculated as below:

$$Bi = \Phi(Pi - Di) \quad (i \text{ is from 1 to 9}) \quad (10)$$

$$Pi > Di \rightarrow \Phi(Pi - Di) = 1 \text{ (black)}$$

$$Pi = < Di \rightarrow \Phi(Pi - Di) = 0 \text{ (white)}$$

Figure 28:
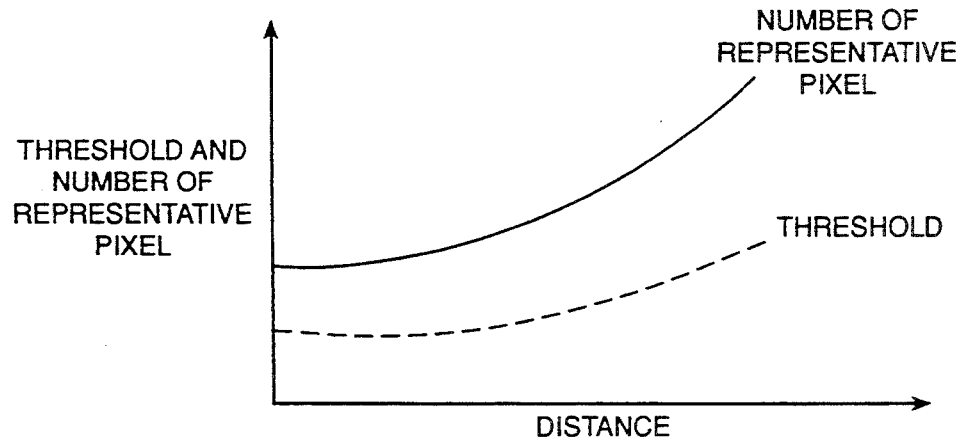
FIG. 28 is a diagram showing the relationship between the representative pixel value and threshold.

When P1 to P9 are a constant density, the number of black pixels and white pixels in the area corresponding to the dither cell in the dither image represent the average density and brightness in the area, respectively. This average density will be referred to as a "representative pixel value." A representative pixel value represents the mean density or mean brightness in the area corresponding to each dither cell. Suppose that the mean density or mean brightness reflects the lighting condition. The image equivalent to one whose light condition is corrected to be flat and binarized can be obtained when an approximately middle value of representative pixel values is the threshold. A first dimensional area of it is shown in FIG. 28

As to an image processing system in FIG. 26, an output of comparator 4 is input to a threshold calculation portion 7, in which the value of a representative pixel in the area corresponding to each dither cell is calculated, and its approximate middle value is output as a threshold. The threshold is registered in threshold plane 2 as the threshold corresponding to all the pixels in each dither cell area (3×3, in FIG. 27). The processing above is executed in 1 scan (from 1/30 sec. to 1/60 sec., usually).

In the second scan, the original image and the thresholds are read out pixel by pixel from memory 1 and memory 2, respectively, and they are compared in comparator 4. Through the processing, binarization with the suitable threshold is performed.

The image produced after thresholding is written and registered in output plane 3. The output of the comparator 4 is selectively input to the threshold calculation portion 7 or to the output plane 3, as selected by multiplexer 8.

Figure 29:
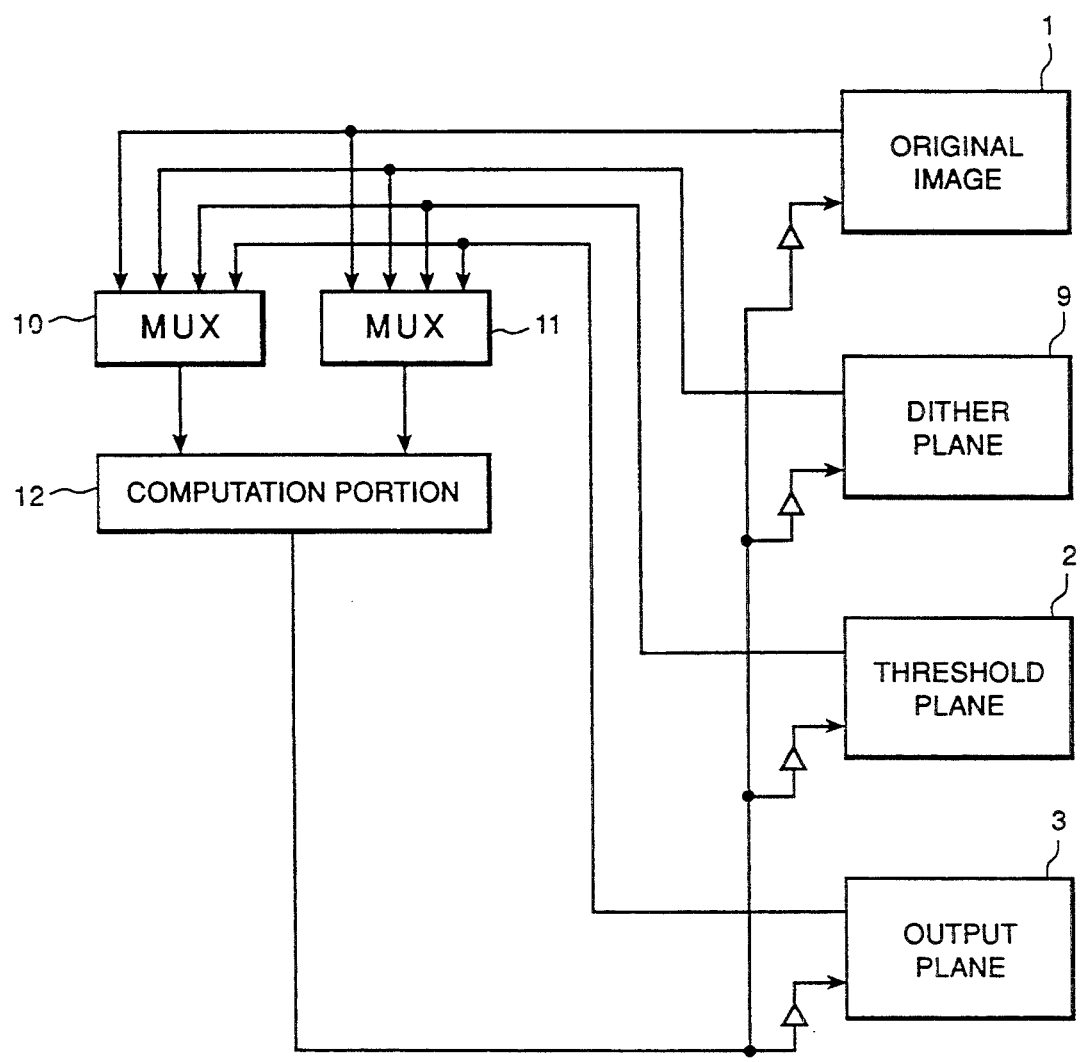
FIG. 29 is a block diagram showing an image processing system for an alternate embodiment.

FIG. 29 shows an embodiment of the present invention. It performs the same processing as in FIG. 26 by an image processing system of wider usage.

The image processing system in FIG. 29 comprises a memory 9 for storing dither cells, in addition to memories 1 to 3 for storing an original image, thresholds and an output image, respectively. Memory 9 is used as the dither plane to hold dither cells for a whole image.

All of the outputs of memories from 1 to 3 and 9 are input to a pair of multiplexers 10 and 11, whose outputs are input to computation portion 12.

Computation portion 12 calculates representative pixel values in dither processing and the results of dither processing in formula (10). Calculated thresholds are stored in threshold plane 2. Threshold plane 2 or the original image 1 is selected by multiplexers 10 and 11. Threshold processing is performed on the original image by computation between both images. The result of the threshold process is stored in output plane 3.

In this way, image memory can be applied for another use and consequently, its usage becomes wider by adopting a structure for storing dither cells in memory.

It is possible to apply the image processing system in FIG. 29 to general image processing by adapting the computation portion 12 to perform one or both of the computations between images and convolution processing.

What is claimed is:

1. An electronic apparatus for converting a multitone image into a two-tone image comprising:
   an original image memory having capacity for storing an original image;
   a threshold plane memory having at least enough capacity to store a threshold value for each of a number of areas of the original image memory;
   an output image memory having at least enough capacity to store a binarized image derived from an image stored in the original image memory;
   a dither memory having enough capacity to store values of a dither cell;
   means for applying the dither cell to the original image to generate pixels of a dither image;
   means for deriving representative density values from pixels of the dither image;
   means for determining a threshold value from representative values; and
   means for applying a threshold value to the original image to generate a two-tone image.

2. The apparatus of claim 1 wherein the means for applying the dither cell includes a switch selectively connecting the dither memory to a first input of a comparator, said comparator having a second input connected to the original image memory.

3. The apparatus of claim 1 wherein the means for deriving representative density values includes a switch selectively connecting the a comparator output to a calculation circuit, said comparator having a first input connected to the dither memory and a second input connected to the original image memory.

4. The apparatus of claim 1 wherein the means for applying a threshold value to the original image includes a switch selectively connecting the threshold memory to a first input of a comparator, said comparator having a second input connected to the original image memory.

5. The apparatus of claim 1 wherein the means for applying the dither cell includes:
   a first switch selectively connecting the dither memory to an input to a calculation circuit; and
   a second switch selectively connecting the original image memory to a second input to the calculation circuit.

6. The apparatus of claim 1 wherein the means for applying a threshold value to the original image includes:
- a first switch selectively connecting the threshold memory to an input to a calculation circuit; and
- a second switch selectively connecting the original image memory to a second input of the calculation circuit.

7. An apparatus for converting a multi-tone image into a two-tone image comprising:
- an original image memory having capacity for storing an original image;
- a threshold plane having at least enough capacity to store a threshold value for each of a number of areas of the original image memory;
- an output image memory having at least enough capacity to store a binarized image derived from an image stored in the original image memory;
- a dither memory having enough capacity to store values of a dither cell;
- a comparator having a first input connected to the original image memory;
- a multiplexer selectively connecting the dither memory and the threshold plane to a second input of the comparator;
- a multiplexer selectively connecting the comparator output to the output plane and to an input of a calculating circuit, said calculating circuit having an output connected to the threshold plane.

* * * * *